(12) United States Patent
Simon et al.

(10) Patent No.: US 7,155,131 B2
(45) Date of Patent: Dec. 26, 2006

(54) OPTICAL COMMUNICATION DEVICES, LIGHT EMISSION DEVICES AND OPTICAL COMMUNICATION METHODS

(75) Inventors: Jonathan Simon, San Leandro, CA (US); Scott Corzine, Sunnyvale, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 625 days.

(21) Appl. No.: 09/999,758

(22) Filed: Oct. 23, 2001

(65) Prior Publication Data

US 2003/0076566 A1 Apr. 24, 2003

(51) Int. Cl.
*H04B 10/12* (2006.01)
*H01S 3/10* (2006.01)
*H01S 3/13* (2006.01)
*H01S 3/098* (2006.01)

(52) U.S. Cl. .......................... 398/186; 372/19; 372/20; 372/29.01

(58) Field of Classification Search ............... 398/183, 398/186, 201, 184, 65; 372/18, 19, 20, 27, 372/28, 29.01; 359/237, 238, 243, 245
See application file for complete search history.

(56) References Cited

U.S. PATENT DOCUMENTS

| | | | |
|---|---|---|---|
| 5,179,564 A * | 1/1993 | Benda et al. | 372/27 |
| 5,396,508 A | 3/1995 | Bour et al. | |
| 5,412,678 A | 5/1995 | Treat et al. | |
| 5,438,584 A | 8/1995 | Paoli et al. | |
| 5,513,196 A * | 4/1996 | Bischel et al. | 372/22 |
| 5,742,418 A * | 4/1998 | Mizutani et al. | 398/184 |
| 5,930,283 A * | 7/1999 | Imai et al. | 372/94 |
| 6,130,903 A * | 10/2000 | Moloney et al. | 372/50.22 |
| 6,529,304 B1 * | 3/2003 | Kimura et al. | 398/157 |
| 6,580,535 B1 * | 6/2003 | Schönfelder | 398/65 |
| 6,771,679 B1 * | 8/2004 | Schie | 372/38.1 |
| 6,798,804 B1 * | 9/2004 | Hayakawa | 372/43 |
| 2002/0159487 A1 * | 10/2002 | Thornton et al. | 372/26 |
| 2002/0176457 A1 * | 11/2002 | DeCusatis et al. | 372/26 |
| 2002/0181833 A1 * | 12/2002 | Berger | 385/15 |
| 2003/0058901 A1 * | 3/2003 | Jacobowitz et al. | 372/20 |

OTHER PUBLICATIONS

A. Valle, "Selection and Modulation of High-Order Transverse Modes in Vertical-Cavity Surface-Emitting Lasers", IEEE Journal of Quantum Electronics, vol. 34, No. 10, Oct. 1998.*
W. Johnston et al., "Competition and Stimulated Switching of Transverse Laser Modes", IEEE Journal of Quantum Electronics, Jul. 1968.*

(Continued)

*Primary Examiner*—Shi Ki Li (57) ABSTRACT

The invention relates to optical communication devices, light emission devices and optical communication methods. Aspects of the present invention provide methods and devices enable provision of modulated output optical signals without providing modulation of total photon populations of cavities of associated lasers. Such avoids or minimizes bandwidth restrictions associated with conventional methods or devices which modulate total photon populations within cavities of lasers. One aspect of the invention includes an optical communication method including providing a data signal comprising data to be communicated and emitting light using a laser. The method further includes modulating the laser across a lasing mode transition responsive to the data signal. The emitting further includes emitting the light during a plurality of lasing modes of the laser to communicate the data responsive to the modulating.

10 Claims, 4 Drawing Sheets

OTHER PUBLICATIONS

K. Hahn et al., "Large Area Multitransverse-Mode VCSELs for Modal Noise Reduction in Multimode Fibre Systems", Electronics Letter, vol. 29, No. 16, Aug. 5, 1993.*

Bour, D.P. et al., "Dual-Polarization, Single Quantum-Well AlGaInP Laser Diode Structure", IEEE Journal of Quantum Electronics, vol. 30, No. 12, Dec. 1994, pp. 2738-2742.

* cited by examiner

OPTICAL COMMUNICATION DEVICES, LIGHT EMISSION DEVICES AND OPTICAL COMMUNICATION METHODS

TECHNICAL FIELD

The invention relates to optical communication devices, light emission devices and optical communication methods.

BACKGROUND OF THE INVENTION

Semiconductor lasers are utilized in a wide variety of applications. The relatively small size, low input power requirements and high power conversion efficiencies of semiconductor lasers make them well-suited for fiber-optic applications.

Conventional semiconductor laser configurations are implemented as diodes typically consisting of multiple epitaxial layers provided upon an appropriate substrate, such as indium phosphide. An active layer, such as indium gallium arsenide phosphide is sandwiched between n and p-type cladding layers of the substrate material in some configurations. Opposing metal contacts are provided about the structure and a bias current is applied to the contacts to generate light at a wavelength determined by the energy gap of the active layer.

Semiconductor lasers are modulated to communicate information in fiber-optic applications. Intensity modulation is a common type of modulation in optical communication systems. One example is digital pulse code modulation wherein the laser is directly driven by the baseband signal. Subcarrier multiplexed systems are also frequently utilized wherein the laser is driven by an RF or microwave subcarrier modulated by a data signal.

Demands for high speed network applications continue to increase as more people and businesses rely upon networks for fast, reliable communication of voice and data. Further, broadband optical systems benefit from using lasers having wider bandwidths than the system bandwidth to provide flatter and more efficient responses and reduction in intensity noise, distortion and phase deviation. Accordingly, it is desired to provide systems with the highest possible bandwidths.

Some laser configurations have bandwidths limited to a few gigahertz by a number of factors including diode resistance, capacitance and bond-wire inductance, for example. A further limitation upon bandwidth includes the inherent restrictions imposed by modulating the total photon population of the laser cavity. When modulation frequencies exceed the normal bandwidth of a laser, the total photon population no longer responds to the input modulation. There exists a need to provide improved devices and methodologies which avoid limitations experienced with conventional designs.

SUMMARY OF THE INVENTION

Aspects of the present invention relate to optical communication devices, light emission devices, and optical communication methods. Exemplary applications relate to originating source devices of communications systems and methods of originating information for communication within communications systems. As described in detail herein, the devices and methodologies of the invention generate optical signals having a plurality of information states to communicate information or for use in other applications wherein a plurality of distinguishable states of the signal are desired. According to exemplary aspects of the present invention, different information states are represented by different intensity levels of an optical signal. Methods and devices are disclosed which provide modulated output optical signals without modulation of the total photon populations of cavities of associated lasers according to exemplary arrangements. Such avoids or minimizes bandwidth restrictions associated with conventional methods or devices which modulate total photon populations.

In one implementation of the invention, sources of light are implemented as semiconductor lasers configured to operate in a plurality of lasing modes, including controlled operation in one or more of plural polarization modes, plural spatial modes and plural spectral modes. A filter is provided optically coupled with the laser according to one aspect of the invention. The filter is configured to provide intensity modulation of the emitted optical signal via mode selective filtering operations. The filter is configured according to the lasing modes of operation of the laser and may provide wavelength\spectral filtering, polarization filtering, and\or spatial filtering in exemplary configurations. More specifically, and in accordance with an exemplary configuration, the filter is arranged to filter out substantially all light emitted responsive to operation of the laser in a given lasing mode while passing substantially all light emitted responsive to the operation of the laser in another of the lasing modes. Aspects of the present invention enable mode transitions to be converted into larger amplitude changes in output light intensity.

The laser is biased in one arrangement in the vicinity of at least one lasing mode transition, also referred to as a mode-hop boundary, intermediate plural lasing modes of the same type (e.g., polarization, spatial or spectral) in one example. A mode selection device is arranged to modulate the laser across the lasing mode transition resulting in the emission of light during a plurality of lasing modes of the laser. In exemplary arrangements, the mode selection device is implemented as an external light source, modulation device and\or an electrical source. The mode selection device is configured to modulate the laser using optical injection, current injection or gain\loss modulation in exemplary configurations. A control signal, containing data to be communicated in some exemplary implementations of the invention, is utilized to control the mode selection device, modal state of operation of the laser, and intensity modulation of emitted optical signals in the described exemplary configuration.

According to one aspect of the invention, an optical communication device is disclosed. The optical communication device includes an interface adapted to receive a data signal comprising data to be communicated and a laser configured to emit light during operation in a plurality of lasing modes. The device further provides a filter coupled with the laser and configured to pass light corresponding to one of the lasing modes and to filter out light corresponding to another of the lasing modes. A mode selection device of the optical communication device is coupled with the laser and is configured to control the operation of the laser in the one and the another lasing modes responsive to the data signal.

Another aspect of the invention provides a light emission device comprising a laser configured to emit light in first and second modes. The light emission device further includes a filter optically coupled with the laser and configured to attenuate light emitted during the first mode and to substantially pass light emitted during the second mode.

Another aspect of the invention provides an optical communication method including providing a data signal comprising data to be communicated and operating a laser in a plurality of lasing modes to emit light. The method further provides passing light corresponding to one of the lasing modes, filtering light corresponding to another of the lasing modes, and controlling the laser to operate in the one and the another lasing modes to communicate the data of the data signal.

Yet another aspect of the invention discloses an optical communication method which includes providing a data signal comprising data to be communicated and emitting light using a laser. The method further includes modulating the laser across a lasing mode transition responsive to the data signal. The emitting further includes emitting the light during a plurality of lasing modes of the laser to communicate the data responsive to the modulating.

As described, the present invention has both method and structural aspects. Certain embodiments of the invention provide other advantages and configurations in addition to or in lieu of the advantages and configurations described above, as is apparent from the description below with reference to the following drawings.

BRIEF DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

Like references herein are utilized to depict like components with differences therebetween being represented by a distinguishing suffix such as "a".

Figure 1:
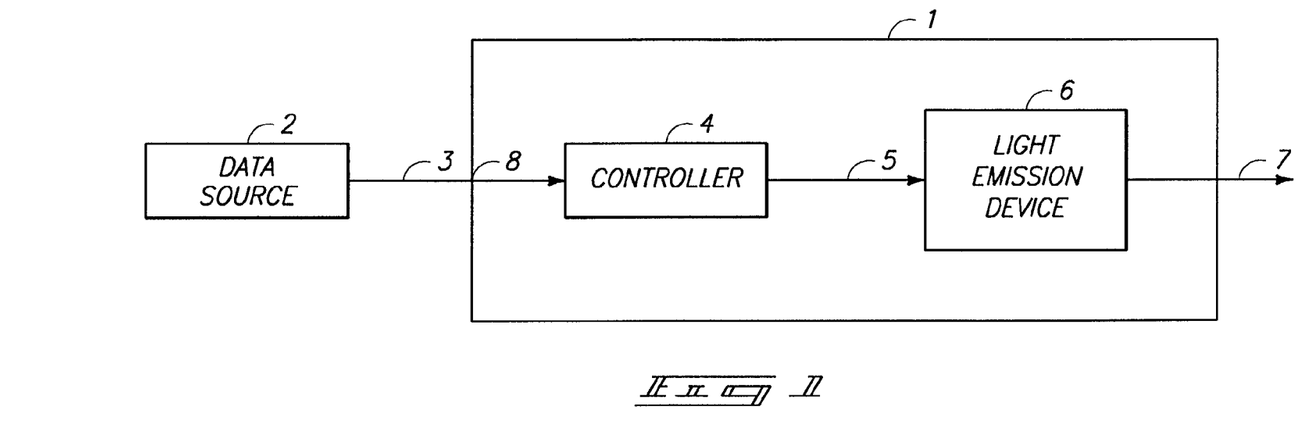
FIG. 1 is a function block diagram of an exemplary optical communication device coupled with a data source.

Referring to FIG. 1, an exemplary optical communication device 1 is depicted coupled with a data source 2. The optical communication device 1 is described herein with reference to an optical network application wherein optical communication device 1 is an originating source device configured to provide modulated optical signals for communication of information. Optical communication device 1 may be implemented in other applications where it is desired to provide a source device capable of generating an optical signal 7 having a plurality of information states to communicate information. As described below, different information states are represented by different intensity levels of optical signal 7.

Optical communication device 1 includes a controller 4, a light emission device 6, and an interface 8 in the exemplary configuration. Data source 2 is configured to couple with interface 8 of optical communication device 1. Data source 2 is configured to output a data signal 3 comprising an electrical signal in the described embodiment, and having data embodied therein for communication using optical communication device 1. According to other embodiments, the data signal does not contain data to be communicated but is utilized as a control signal for controlling the operation of light emission devices.

Exemplary configurations of data source 2 include sources having information for communication within an optical network. Data source 2 may be implemented as a source device of a data interconnect, a source device implemented within a central office, or other originating source configurations providing data to be communicated by optical communication device 1. Data source 2 outputs control signal 3 comprising digital data in one exemplary embodiment. Optical communication device 1 is configured to originate the information in an appropriate format for communication within an associated medium responsive to control signal 3.

Interface 8 is configured to receive data signal 3 which embodies the data to be communicated. Controller 4 receives the data signal 3 from interface 8. Controller 4 is configured to output a control signal 5 responsive to the received data signal 3. Control signal 5 is provided as an electrical signal to control light emission device 6 to communicate the data received within data signal 3.

In one exemplary embodiment, controller 4 is configured to vary an electrical characteristic of control signal 5, such as voltage or current, responsive to data signal 3 and to control light emission device 6 to communicate the received data. Controller 4 is implemented as processing circuitry configured to execute firmware and/or software instructions stored within an appropriate memory device (not shown) in one arrangement. Alternatively, controller 4 is implemented as a hardware circuit to control functions described herein.

Light emission device 6 is configured to output an optical signal 7 embodying data originated from data source 2 for communication to an appropriate destination device (not shown) via an appropriate medium. In an exemplary configuration, optical communication device 1 is coupled with an appropriate waveguide (not shown), such as an optical fiber, free space or other appropriate medium to communicate optical signals 7 to one or more destination device (not shown). According to aspects of the present invention, light emission device 6 is configured to modulate the optical signal 7 responsive to the control signal 5 to communicate the data from data source 2.

Referring to FIGS. 2–5, exemplary configurations of the light emission device are shown as respective references 6, 6a, 6b, 6c. The light emission devices 6, 6a, 6b, 6c of FIGS. 2–5 include a respective laser 14, 14a, 14b, 14c configured to emit light. The depicted lasers 14, 14a, 14b, 14c are implemented as semiconductor lasers, such as edge emitting lasers although other laser configurations, such as vertical cavity surface emitting lasers (VCSELs), are possible.

According to aspects of the present invention, lasers 14, 14a, 14b, 14c are modulated across one or more type of lasing mode transition responsive to data within data signal 3. Accordingly, such lasers 14, 14a, 14b, 14c operate in a plurality of lasing modes about the respective lasing mode transition(s). As described in further detail below, modulating the laser 14, 14a, 14b, 14c across one or more type of lasing mode transition operates to communicate data within optical signal 7 outputted from light emission device 6, 6a, 6b, 6c using a plurality of lasing modes of the respective laser. The number of photons within cavities of lasers 14, 14a, 14b, 14c remains substantially constant and the modal state of the photons change during operation of the lasers in the plural lasing modes.

The light emission devices 6, 6a, 6b, 6c further include a plurality of mode selection devices 20, 20a, 20b, 20c arranged to control the operation of respective lasers 14, 14a, 14b, 14c in a plurality of lasing modes across one or more type of lasing mode transition according to aspects of the invention and as described in further detail below.

Figure 2:
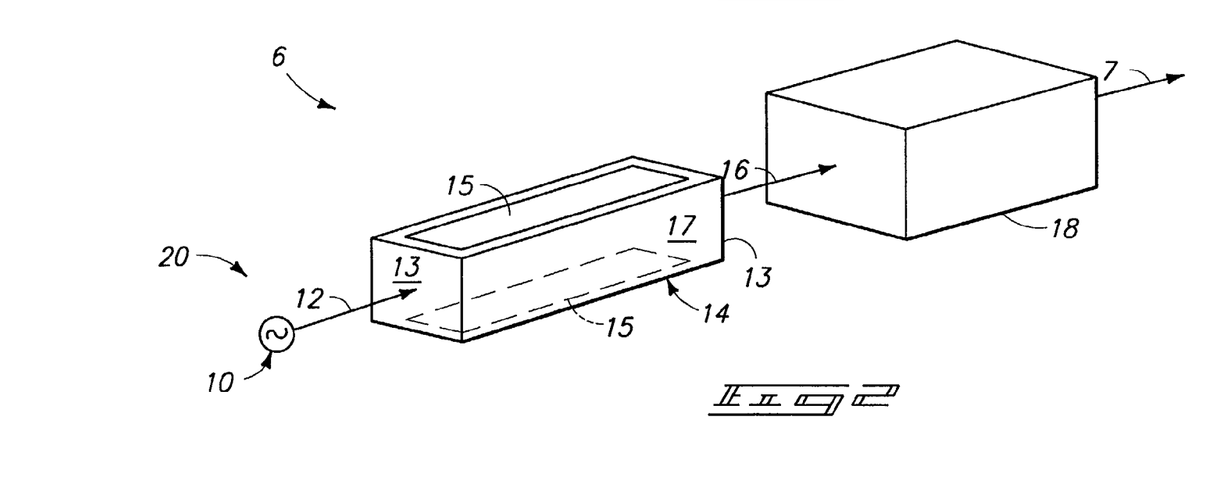
FIG. 2 is an illustrative representation of an exemplary light emission device of the optical communication device.

Referring initially to FIG. 2, the depicted light emission device 6 includes mode selection device 20, laser 14 and a filter 18. In the embodiment depicted in FIG. 2, mode selection device 20 is implemented as an external light source 10. External light source 10, laser 14 and filter 18 are optically coupled in the depicted arrangement. In an exemplary arrangement, filter 18 is provided at the output of laser 14 and is configured such that no or minimal light is reflected from filter 18 back into laser 14.

External light source 10 is coupled with controller 4 and is configured to receive an electrical control signal 5 therefrom. Control signal 5 operates to AC modulate external light source 10 in one exemplary methodology providing a modulated optical signal 12 which is communicated to laser 14.

Laser 14 is configured to emit light in an optical signal 16 which is provided to filter 18. Laser 14 includes a plurality of mirrors 13 which define a cavity 17. In other embodiments, one or more of mirrors 13 is spaced from laser 14, implemented as a semiconductor laser in the described embodiment. A plurality of electrodes 15 are provided in an opposing relationship about cavity 17. Laser 14 is configured to operate in a plurality of lasing modes to emit light comprising optical signal 16. In the depicted arrangement of FIG. 2, an electrical DC bias signal is applied across electrodes 15 to bias laser 14 in the vicinity of at least one lasing mode transition intermediate a plurality of different lasing modes. The lasing mode transitions may be individually referred to as a mode-hop boundary between plural lasing modes of the same type including polarization modes, spatial modes or spectral modes, for example.

In the implementation depicted in FIG. 2, mode selection device 20 of FIG. 2 is configured to modulate laser 14 using optical injection. More specifically, and in accordance with one exemplary embodiment, mode selection device 20 is coupled with laser 14 and is configured to control the operation of laser 14 in the lasing modes responsive to control signal 5 and data signal 3. In the presently described exemplary embodiment, mode selection device 20 comprising external light source 10 is configured to provide modulation of optical signal 12 to control the operation of laser 14 in the plurality of lasing modes responsive to control signal 5. Mode selection device 20 is configured to modulate the optical signal 12 responsive to data within data signal 3 and control signal 5.

An appropriate electrical bias is applied about electrodes 15 to bias laser 14 in the vicinity of one or more type of lasing mode transition as mentioned above. One exemplary lasing mode transition type includes a transition between lasing modes comprising spatial distribution modes according to one aspect. According to another aspect, laser 14 is biased in the vicinity of a lasing mode transition between lasing modes comprising polarization modes. According to additional aspects of the invention, laser 14 is biased in the vicinity of a lasing mode transition between lasing modes comprising spectral modes. According to further aspects of the invention, modulation of the laser may result in changes in more than one type of lasing mode. For example, spatial distribution lasing modes, polarization lasing modes and/or spectral lasing modes may simultaneously change resulting in modulation of laser 14 across one or more type of lasing mode transition.

Biasing of laser using electrodes 15 determines the lasing mode transition of laser 14. For example, a DC signal applied to one of electrodes 15, and having a current of a first value operates to bias laser 14 in the vicinity of a first lasing mode transition (e.g., between plural polarization lasing modes). Another DC signal applied to one of electrodes 15 and having a current of a second value different than the first value may be utilized to bias laser 14 in the vicinity of another lasing mode transition (e.g., between plural spatial or spectral modes). As stated above, appropriate biasing may be used to provide simultaneous changes of two or more of the lasing mode types responsive to operations of mode selection device 20.

AC modulation of mode selection device 20 using control signal 5 controls the operation of laser 14 in plural lasing modes about one or more type of lasing mode transition in the embodiment of FIG. 2. Laser 14 is modulated by optically injecting modulated light 12 from external source 10. External source 10 is AC modulated responsive to control signal 5 in the described embodiment to provide the modulated optical signal 12. Control signal 5 modulates external light source 10 to provide the modulated optical signal 12. In one instance, external light source 10 provides modulation of one or more of amplitude, wavelength or polarization of optical signal 12. Reception of modulated optical signal 12 within cavity 14 results in modulation of laser 14 across one or more type of lasing mode transition (e.g., spatial, wavelength, and\or polarization) corresponding to the selected biasing of laser 14, the type of laser 14 (e.g., vertical, edge emitting, etc.), and the modulation of optical signal 12 (amplitude, wavelength, and\or polarization).

Filter 18 is optically coupled with laser 14 and is configured to pass light corresponding to one or more of the lasing modes and to filter out light corresponding to another one or more of the lasing modes of laser 14. Filter 18 is configured corresponding to the biasing of laser 14 about one or more type of lasing mode transition. In some configurations, filter 18 is arranged to simultaneously filter or pass electromagnetic energy corresponding to more than one type of lasing mode. Exemplary filtering operations of filter 18 are described below with reference to FIGS. 6–8.

According to additional aspects of the invention, mode selection device 20 does not generate external light but is rather implemented in a feedback arrangement configured to receive light 16 outputted from laser 14 and to modulate such light 16 responsive to an AC modulated control signal 5 to provide optical signal 12. Thereafter, the modulated light comprising optical signal 12 is injected into laser cavity 17. Other configurations are possible for injecting light into cavity 17 to control the operation of laser 14 in a plurality of lasing modes.

Figure 3:
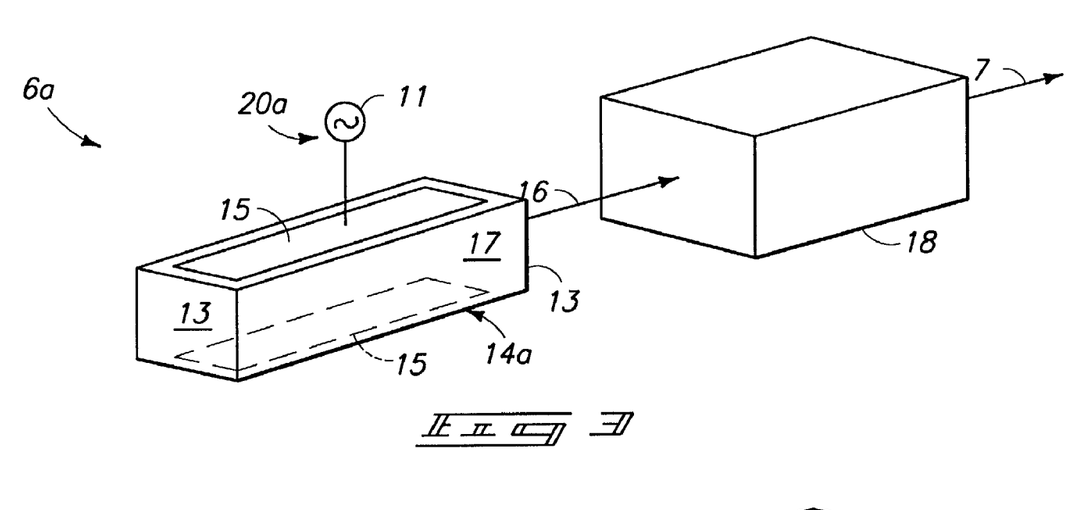
FIG. 3 is an illustrative representation of an exemplary configuration of an alternative light emission device.

Referring to FIG. 3, another exemplary configuration of the light emission device is depicted as reference 6a. Light emission device 6a includes a laser 14a, filter 18 and a mode selection device 20a. The depicted mode selection device 20a is configured to modulate laser 14a using current injection. In the depicted embodiment, mode selection device 20a is configured as an AC electrical source 11 configured to provide a modulation signal to an electrode 15 of laser 14a to control the operation of laser 14a in the plurality of lasing modes as determined by the biasing of laser 14a.

AC source 11 is coupled with controller 4 and is configured to provide an AC modulated electrical signal to electrode 15 of laser 14a responsive to the control signal 5 from controller 4 and corresponding to data within data signal 3. According to one exemplary embodiment, mode selection device 20a configured as AC source 11 provides an AC modulation signal upon a DC bias current also applied to electrode 15 coupled with AC source 11. Accordingly, the DC bias current is chosen to bias laser 14a in the vicinity of one or more type of lasing mode transition. Modulation of the electrical signal applied to electrode 15 causes laser 14a to modulate in lasing modes between the one or more type of lasing mode transition.

Figure 4:
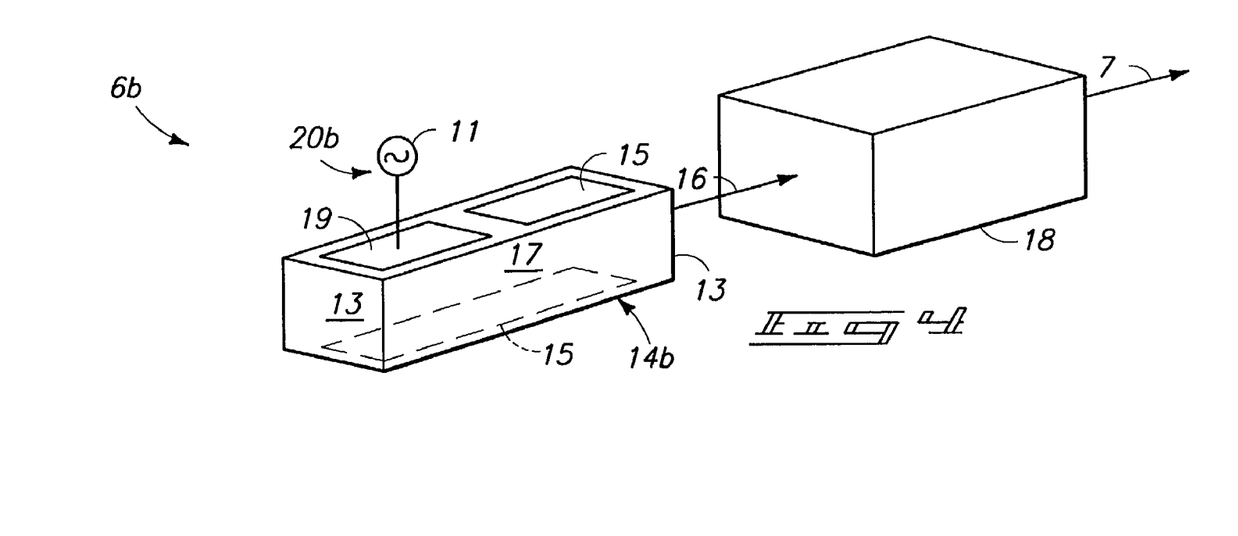
FIG. 4 is an illustrative representation of an exemplary configuration of another alternative light emission device.

Referring to FIG. 4, another arrangement of light emission device is depicted as reference 6b. Light emission device 6b comprises a laser 14b, filter 18 and a mode selection device 20b in the described embodiment. Mode selection device 20b provides gain\loss modulation of laser 14b in the illustrated exemplary configuration.

As shown, laser 14b includes electrodes 15 for biasing using DC current as previously described. In addition, mode selection device 20b implemented as an AC electrical source 11 is coupled with a secondary electrode 19. Biasing signals are provided to electrodes 15 while AC modulation is provided to secondary electrode 19. Mode selection device 20b implemented as AC source 11 in the described embodiment is coupled with controller 4 and is configured to receive the control signal 5 therefrom. AC source 11 is configured to provide an AC modulated electrical signal to secondary electrode 19 to modulate gain or loss in the cavity 17. According to the selected biasing of laser 14b, modulation across one or more type of lasing mode transition is provided.

Figure 5:
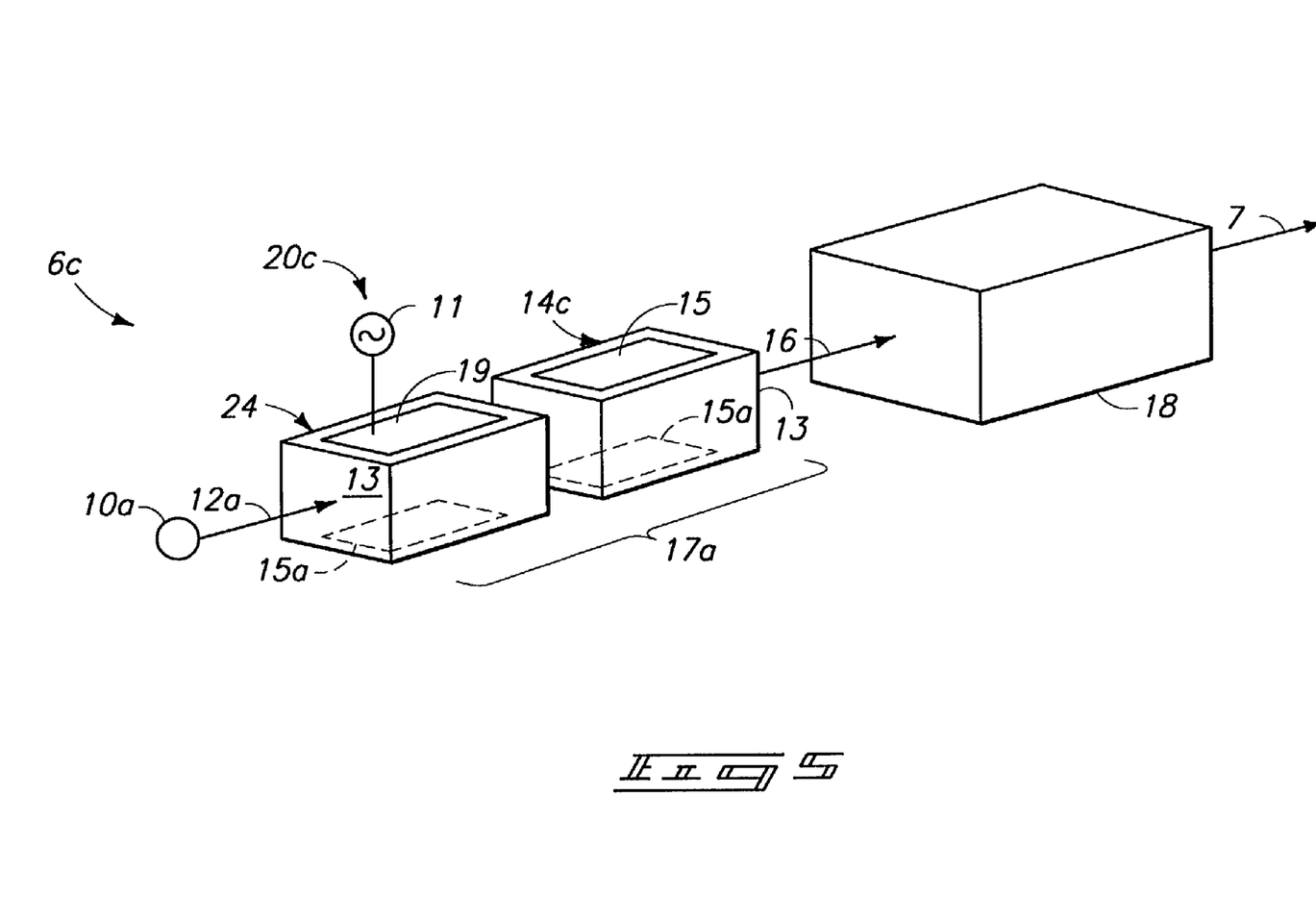
FIG. 5 is an illustrative representation of an exemplary configuration of yet another alternative light emission device.

Referring to FIG. 5, another arrangement of light emission device is depicted as reference 6c. Light emission device 6c comprises an external light source 10a, a laser 14c, filter 18 and a mode selection device 20c in the described embodiment. External light source 10a provides an optical signal 12a in the described exemplary configuration. Optical signal 12a may be a constant light signal (i.e., not modulated) in the illustrated embodiment. Light source 10a is optional in the depicted embodiment.

Mode selection device 20c comprises AC source 11 and a modulation device 24 in the exemplary configuration. As shown, one of mirrors 13 is depicted external of laser 14c implemented as a semiconductor chip in the exemplary configuration and having an external cavity 17a. Alternatively, both mirrors 13 are positioned externally of laser 14c in another embodiment.

As shown, laser 14c includes electrodes 15, 15a for biasing using DC current as previously described. Source 11 is configured to provide an AC modulated electrical signal to electrode 19 of modulation device 24 to modulate light passing therethrough. According to the selected biasing of laser 14c, modulation across one or more respective type of lasing mode transition is provided.

Modulation device 24 comprises a portion of external cavity 17a placed in the optical path between laser 14c and one of laser mirrors 13. Modulation device 24 is configured to modulate phase, amplitude, spatial distribution, or polarization of light passing therethrough affecting the mode structure of external-cavity laser 14c responsive to the control signal from source 11. Exemplary modulation devices 24 include lithium niobate modulators (e.g., arranged in a Mach-Zender interferometer configuration), semiconductor electro-absorption modulators or phase modulators. In general, materials that exhibit relatively large electro-optic coefficients can be used as modulation device 24 to modulate the phase, amplitude, spatial distribution, or polarization of the light responsive to the application of a control signal from source 11.

Figure 6:
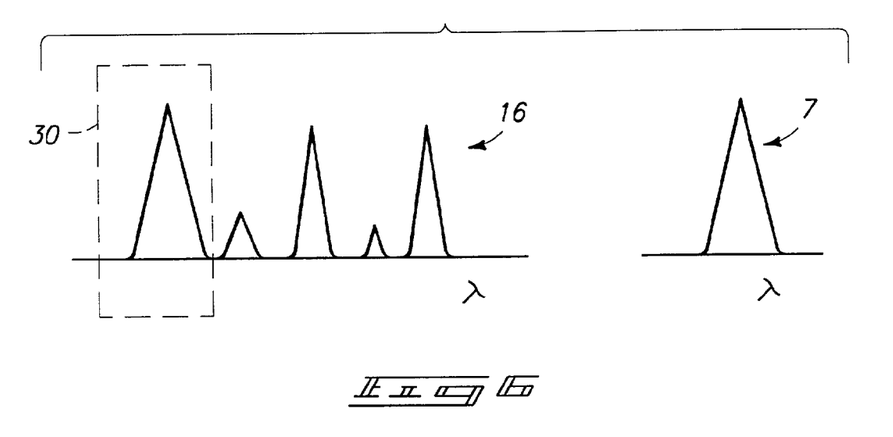
FIG. 6 is an illustrative representation of exemplary spectral filtering operations within a light emission device.
Figure 7:
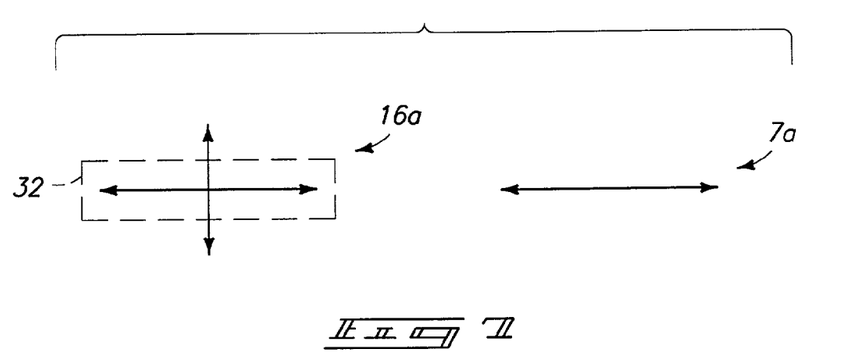
FIG. 7 is an illustrative representation of exemplary polarization filtering operations within a light emission device.
Figure 8:
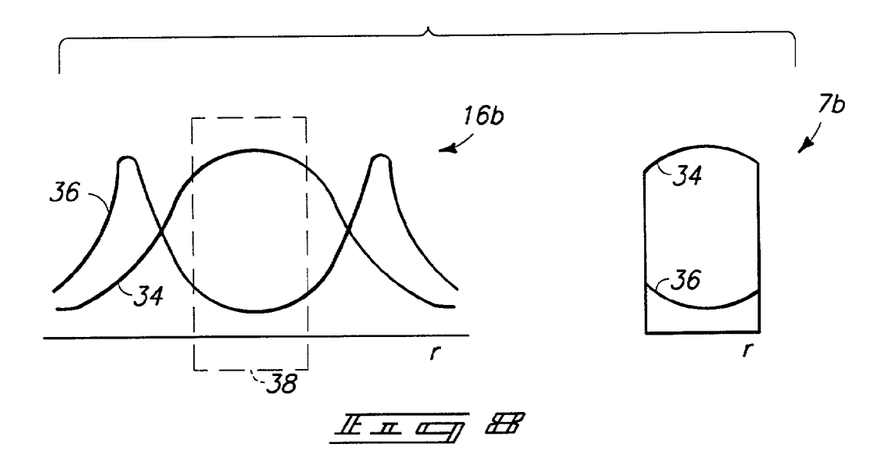
FIG. 8 is an illustrative representation of exemplary spatial filtering operations within a light emission device.

Referring to FIGS. 6–8, exemplary filtering operations of various configurations of filter 18 are illustrated. In the described configuration, filter 18 provides mode selective filtering operations including wavelength/spectral filtering, polarization filtering, and/or spatial filtering depending upon biasing of lasers 14, 14a, 14b, 14c about one or more type of lasing mode transition.

Filter 18 is utilized to provide the outputted optical signal 7 as an intensity modulated signal corresponding to the data within data signal 3 in one aspect of the invention. For example, during a default operation of laser 14, 14a, 14b, 14c, light is emitted corresponding to one or more type of default lasing mode. The default lasing mode(s) represents the operation of laser 14, 14a, 14b, 14c in one state as controlled by controller 5 responsive to data within data signal 3. When the data changes information state within data signal 3, controller adjusts control signal 5 which is provided to the appropriate mode selection device 20, 20a, 20b, 20c. Mode selection device 20, 20a, 20b, 20c thereafter operates to modulate the respective laser 14, 14a, 14b, 14c to emit light in another operational state having one or more type of lasing mode different than the default operational state.

Filter 18 is configured to pass light within optical signal 16 during the operation of laser 14, 14a, 14b, 14c in one of the default or other lasing operational states and to not pass light of signal 16 in the other operational state to provide communication of information having different information states, such as corresponding to digital high and low values. Such provides an intensity modulated optical signal 7 responsive to data within data signal 3.

Referring to FIG. 6, wavelength/spectral filtering operations of filter 18 are described. FIG. 6 depicts a wavelength signature corresponding to one or more wavelength of optical signal 16 outputted from one of the lasers 14, 14a, 14b, 14c and received within a respective filter 18. Filter 18 has a passband 30 corresponding to one or more wavelength of light wherein filter 18 removes light outside of passband 30 and passes light within passband 30. During one of the states of operation of laser 14, 14a, 14b, 14c, optical signal 16 contains light within passband 30 while substantially minimal or no light of optical signal 16 is present in passband 30 corresponding to the other operational state of the laser. Filter 18 outputs signal 7 corresponding to the pass band 30 of filter 18.

FIG. 7 depicts filter 18 configured to provide polarization filtering. In the described exemplary embodiment, filter 18 is configured to pass horizontally polarized light 32 and to filter or remove vertically polarized light. Accordingly, optical signal 16a outputted from one of lasers 14, 14a, 14b, 14c includes horizontally polarized light during operation of laser 14, 14a, 14b, 14c in one of the operational states and does not include substantial amounts of horizontally polarized light during operation of the respective laser in the other of the operational states. The horizontally polarized light is passed as depicted by optical signal 7a while vertically polarized light is filtered out or otherwise removed.

Referring to FIG. 8, spatial filtering within filter 18 is described. Waveform 34 corresponds to a spatial distribution of optical signal 16 resulting from one of the operational states of the appropriate laser 14, 14a, 14b, 14c while waveform 36 corresponds to a spatial distribution of the optical signal 16 resulting from the other operational state of the appropriate laser. Filter 18 is configured to pass light within a given radius range 38 as shown. The depicted radius range 38 is selected to provide distinctive separation between the plural spatial lasing modes of the appropriate laser 14, 14a, 14b, 14c. Although some light is emitted after filter 18 within signal 7b for both modes 34, 36, the radius range is preferably selected to provide sufficient separation of the light within signal 7b resulting from the different spatial lasing modes of the respective laser to enable discrimination between the waveforms 34, 36 within an appropriate detector. As mentioned above, a given filter 18 may be configured to implement more than one type of filtering of FIGS. 6–8 in a given application.

Aspects of the present invention provide methods and devices of modulating the output characteristics of a laser that can be filtered to produce relatively large amplitude variations in the transmitted light and that do not depend upon modulation of the total photon population in the cavity of the laser. The detachment of the modulation of the transmitted light from modulation of the total photon population removes speed restrictions imposed upon conventional devices and allows potentially higher modulation bandwidths to be achieved.

As described, outputted optical signals 7, 7a, 7b comprise amplitude modulated optical signals having two intensity levels corresponding to the respective lasing modes of operation of the appropriate laser 14, 14a, 14b, 14c being utilized. The present invention enables relatively small modulation amplitudes of optical signal 12 or electrical signals applied to electrode 15 or electrode 19 to result in significant detectable intensity modulation of optical signals 7, 7a, 7b inasmuch as mode-hop boundaries are sharp functions of injection level.

Aspects of the present invention enable mode transitions to be converted into large amplitude changes in output light intensity independent of how the total photon populations within cavities 17 of respective lasers 14, 14a, 14b, 14c are fluctuating compared with fluctuations of the total photon properties within cavities 17. A modal state of photons within the cavity of the respective laser 14, 14a, 14b, 14c changes during emission of light in the plural lasing second modes, and a population of the photons within the cavity is substantially constant during emission of light in the first and second lasing modes. Even if the total photon population stops responding to the input modulation beyond the normal bandwidth frequency of the respective laser 14, 14a, 14b, 14c, the mode-hop phenomenon may still respond as described herein allowing extension of the effective modulation bandwidth of the appropriate laser beyond its normal limits. For example, it is believed that bandwidths approaching 50 GHz are obtainable with lasers that are typically limited to bandwidths on the order of 20 GHz due to modulation limitations of the total photon population.

What is claimed is:

1. An optical communication device, comprising:
   a laser biased to operate at a mode-hop boundary between a first spatial distribution mode of operation and a second spatial distribution mode of operation;
   a mode selection device coupled to the laser, the mode selection device operable to selectively place the laser in one of the first spatial distribution mode of operation and the second spatial distribution mode of operation, the mode selection device being further operable to provide a transition between the two modes of operation; and
   a spatial filter coupled to the laser, the spatial filter operative to pass light corresponding to the one of the first spatial distribution mode of operation and the second spatial distribution mode of operation, wherein the light passing through the spatial filter corresponds to a digital high of information.

2. The device of claim 1, wherein the spatial filter is operative to pass light within a first radius range and block light outside the first radius range.

3. The device of claim 1, further comprising an interface coupled to the laser, the interface operative to providing the laser, data signals for optical transmission.

4. The device of claim 1, wherein the mode selection device is operative to selectively place the laser in one of the first spatial distribution mode of operation and the second spatial distribution mode of operation by coupling a first optical signal into the laser.

5. The device of claim 1, wherein the mode selection device is operative to selectively place the laser in one of the first spatial distribution mode of operation and the second spatial distribution mode of operation by coupling a first electrical signal into the laser.

6. A method of optical communication, comprising:
   providing a laser;
   biasing the laser to operate at a mode-hop boundary between a first spatial distribution mode of operation and a second spatial distribution mode of operation;
   providing a control signal to the laser;
   using the control signal to selectively operate the laser in at least one of the first spatial distribution mode of operation and the second spatial distribution mode of operation;
   using the control signal to provide at least one of a first transition from the first spatial distribution mode of operation to the second spatial distribution mode of operation and a second transition from the second spatial distribution mode of operation to the first spatial distribution mode of operation;
   providing a spatial filter; and
   operating the spatial filter to pass a light generated by the laser when the light is within a first radius range and to block the light generated by the laser when the light is in a second radius range.

7. The device of claim 6, wherein the control signal comprises an AC signal.

8. The device of claim 6, wherein using the control signal to provide at least one of the first transition and the second transition constitutes a modulation of an output optical signal of the laser while keeping a total photon population in a cavity of the laser substantially constant.

9. A method of optical communication, the method comprising:
   providing a laser containing a laser cavity;
   biasing the laser to operate at a mode-hop boundary between the first lasing mode and the second lasing mode, wherein the first lasing mode is a first spatial distribution mode of operation and wherein the second lasing mode is a second spatial distribution mode of operation;

providing a control signal to the laser;

using the control signal to provide a transition between the first spatial distribution mode of operation and the second spatial distribution mode of operation;

providing a spatial filter; and generating an intensity modulated optical signal by using the spatial filter to pass light generated by the laser when the laser is operating in the first spatial distribution mode and to block light generated by the laser when the laser is operating in the second spatial distribution mode.

10. The method of claim 9, wherein passing the light through the spatial filter constitutes generating a digital high value of information and blocking the light constitutes generating a digital low value of information.

* * * * *